United States Patent
Liu et al.

(10) Patent No.: US 10,370,274 B2
(45) Date of Patent: Aug. 6, 2019

(54) HYBRID REACTOR AND PROCESS FOR REMOVING SELENIUM

(71) Applicant: BL Technologies, Inc., Minnetonka, MN (US)

(72) Inventors: Minggang Liu, Burlington (CA); Jeffrey Ronald Cumin, Oakville (CA); Glenn Vicevic, Oakville (CA); Carsten Owerdieck, Oakville (CA); Nelson Fonseca, Oakville (CA)

(73) Assignee: BL TECHNOLOGIES, INC., Minnetonka, MN (US)

( * ) Notice: Subject to any disclaimer, the term of this patent is extended or adjusted under 35 U.S.C. 154(b) by 284 days.

(21) Appl. No.: 14/969,713

(22) Filed: Dec. 15, 2015

(65) Prior Publication Data
US 2016/0264438 A1 Sep. 15, 2016

Related U.S. Application Data

(60) Provisional application No. 62/131,579, filed on Mar. 11, 2015.

(51) Int. Cl.
*C02F 3/00* (2006.01)
*C02F 3/12* (2006.01)
(Continued)

(52) U.S. Cl.
CPC .............. *C02F 3/00* (2013.01); *C02F 3/1263* (2013.01); *C02F 3/2826* (2013.01); *C02F 3/302* (2013.01);
(Continued)

(58) Field of Classification Search
CPC .. C02F 9/00; C02F 3/302; C02F 3/006; C02F 2101/106; C02F 2101/20; C02F 3/06;
(Continued)

(56) References Cited

U.S. PATENT DOCUMENTS

| 4,664,804 A | 5/1987 | Morper et al. |
| 5,017,241 A | 5/1991 | Ryan |

(Continued)

FOREIGN PATENT DOCUMENTS

| EP | 0769479 A1 | 4/1997 |
| EP | 0773192 A1 | 5/1997 |

(Continued)

OTHER PUBLICATIONS

Viamajala et al., "Selenite Reduction by a Denitrifying Culture: Batch and Packed-Bed Reactor Studies", Applied Microbiology and Biotechnology, vol. No. 71, Issue No. 6, pp. 953-962, Jan. 24, 2006.

(Continued)

*Primary Examiner* — Claire A Norris

(57) ABSTRACT

A system for treating wastewater containing selenium has a sequencing batch reactor upstream of a fixed film reactor. The sequencing batch reactor may be operated under anoxic conditions while influent is mixed with residual sludge. The SBR reduces total nitrogen, suspended solids, or both. Selenium is removed in the fixed film reactor by biological reduction to elemental selenium.

7 Claims, 2 Drawing Sheets

(51) Int. Cl.
*C02F 3/28* (2006.01)
*C02F 3/30* (2006.01)
*C02F 101/10* (2006.01)

(52) U.S. Cl.
CPC ........ *C02F 3/305* (2013.01); *C02F 2101/106* (2013.01); *Y02W 10/15* (2015.05)

(58) Field of Classification Search
CPC .......... C02F 1/66; C02F 2209/04; C02F 1/72; C02F 3/00; C02F 3/1263; C02F 3/2826; C02F 11/02
USPC ................................................. 210/631, 601
See application file for complete search history.

(56) References Cited

U.S. PATENT DOCUMENTS

| | | | |
|---|---|---|---|
| 5,071,568 | A | 12/1991 | Bennett et al. |
| 5,271,831 | A | 12/1993 | Oremland |
| 5,651,892 | A | 7/1997 | Pollock |
| 5,993,667 | A | 11/1999 | Overman |
| 6,183,644 | B1 | 2/2001 | Adams et al. |
| 7,550,087 | B2 | 6/2009 | Peeters et al. |
| 7,790,034 | B2 | 9/2010 | Peeters et al. |
| 8,163,181 | B2 | 4/2012 | Peeters et al. |
| 2010/0300963 | A1 | 12/2010 | Peeters et al. |
| 2011/0186489 | A1 | 8/2011 | Kain et al. |
| 2012/0006742 | A1* | 1/2012 | Theodore ............. C02F 1/66 210/602 |
| 2012/0024798 | A1 | 2/2012 | Pickett et al. |
| 2012/0152761 | A1 | 6/2012 | Pickett et al. |
| 2013/0270181 | A1* | 10/2013 | Pickett ............. C02F 9/00 210/610 |
| 2014/0209526 | A1 | 7/2014 | Pickett et al. |
| 2014/0263043 | A1 | 9/2014 | Mehta et al. |
| 2015/0034552 | A1 | 2/2015 | Pickett et al. |

FOREIGN PATENT DOCUMENTS

| | | |
|---|---|---|
| EP | 2172430 A1 | 4/2010 |
| JP | 2001062486 | 3/2001 |
| WO | 2007012181 A1 | 2/2007 |
| WO | 2013151434 A1 | 10/2013 |

OTHER PUBLICATIONS

Lenz et al., "Selenate Removal in Methanogenic and Sulfate-Reducing Upflow Anaerobic Sludge Bed Reactors", Water Research, vol. No. 42, Issue No. 8-9, pp. 2184-2194, Apr. 1, 2008.

European Search Report and Opinion issued in connection with corresponding EP Application No. 16159144.1 dated Jul. 18, 2016.

Soda, Satoshi and Mitsuo Yamashita, "Biotechnology for Recovery of Rare Metals in Wastewater and Rare-metal Bioremediation and Recycling using Biotechnology", Junba 2009, Jan. 13, 2009.

United States Environmental Protection Agency, "Wastewater Technology Fact Sheet, Sequencing Batch Reactors", Sep. 1999, pp. 1-9.

European Patent Application No. 16159144.1, Office Action dated Jan. 29, 2018.

* cited by examiner

HYBRID REACTOR AND PROCESS FOR REMOVING SELENIUM

CROSS-REFERENCE TO RELATED APPLICATIONS

This application is a non-provisional application of U.S. application Ser. No. 62/131,579, filed Mar. 11, 2015. U.S. application Ser. No. 62/131,579 is incorporated by reference.

FIELD

This specification relates to a method and apparatus for treating wastewater comprising selenium.

BACKGROUND

The following paragraphs are not an admission that any of the information below is common general knowledge or citable as prior art.

Selenium is an essential trace element, but becomes toxic at very low concentrations. Selenium accumulates in the bodies of plants and fish that live in selenium-contaminated water and in the bodies of wildlife and people that eat those plants and fish. In people, elevated selenium concentrations may cause neurological damage and hair and nail loss.

Selenium has been treated in biological reactors, for example as described in U.S. Pat. No. 6,183,644 and International Publication Number WO 2007/012181, and as used in ABMet™ reactors sold by the GE Water and Process Technologies. In such reactors, dissolved selenium is removed from contaminated water by treating the water in a reactor containing selected endemic and other selenium reducing organisms. Microbes may be isolated from the specific water or imported from other selenium contaminated water. The microbes are then screened for ability to reduce selenium under the site specific environmental conditions. The selected microbes are optimized for selenium reduction, then established in a high density biofilm within a reactor. The selenium contaminated water is passed through the reactor with optimized nutrient mix added as needed. The elemental selenium is precipitated and removed from the water. U.S. Pat. No. 6,183,644 is incorporated herein by reference.

US Publication No. 2010/0300963 describes an apparatus and process for treating flue gas desulfurization blow down water or other wastewaters having selenium. The process has steps of one or more of aerobic treatment to remove chemical oxygen demand and nitrify a waste stream, anoxic treatment to denitrify a waste stream, anoxic treatment to remove selenium and anaerobic treatment to remove heavy metals and sulphur. The process may further include one or more of (a) membrane separation of the waste stream upstream of the anoxic digestion to remove selenium, (b) dilution upstream of the biological treatment step, (c) physical/chemical pretreatment upstream of the biological process or dilution step to remove total suspended solids (TSS) and soften the waste stream, or (d) ammonia stripping upstream of the biological treatment step or dilution step. One or more of these processes may be provided in a membrane bioreactor or a fixed film reactor having a granular activated carbon (GAC) bed. US Publication No. 2010/0300963 is incorporated herein by reference.

SUMMARY OF THE INVENTION

The following summary is intended to introduce the reader to this specification but not define any invention. Inventions may reside in the combination of one or more of the apparatus elements or process steps described anywhere in this document.

The inventors have observed that the performance of a fixed film reactor removing selenium is reduced when treating influent with high nitrate or total suspended solids (TSS) concentrations. For example, scaling or solids fouling can cause poor media bed permeability. The influent may also have compounds that are toxic to selenium reducing organisms.

This specification describes a process and apparatus for treating water comprising selenium. A process is described having the steps of treating the wastewater influent using an anoxic or aerobic/anoxic sequencing batch method to produce an intermediary stream, and reducing the selenium species in the intermediary stream by means of a biological reduction process. When compared to the wastewater influent, the intermediary stream preferably has reduced concentrations of nitrogen or TSS or both, and may also have reduced toxicity, scaling potential and/or concentration of heavy metals.

An apparatus is described herein having a sequencing batch reactor (SBR) configured to receive a wastewater influent, and a fixed film reactor configured to receive effluent from the SBR.

BRIEF DESCRIPTION OF THE FIGURES

Examples of embodiments of one or more inventions will be described below with reference to the Figures described below.

DETAILED DESCRIPTION

Figure 1:
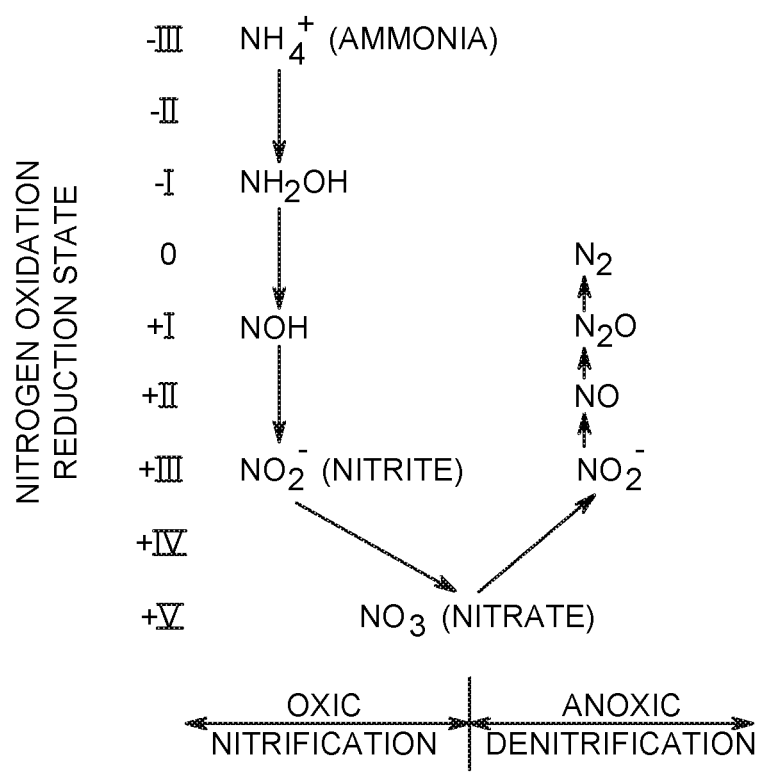
FIG. 1 is a schematic diagram of the nitrogen oxidation reduction states.

Various apparatuses or processes will be described below to provide an example of an embodiment of each claimed invention. No embodiment described below limits any claimed invention and any claimed invention may cover processes and apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. The applicants, inventors and owners reserve all rights in any invention disclosed in an apparatus or process described below that is not claimed in this document and do not abandon, disclaim or dedicate to the public any such invention by its disclosure in this document.

A selenium treating bioreactor may have a media bed containing, for example, granular activated carbon (GAC). In addition to selenium, wastewater influent may contain high concentrations of nitrogen compounds and TSS, which may lead to one or more of poor media bed permeability, scaling and biological toxicity in a biological reactor configured to remove selenium.

Prior to selenium removal, an SBR can be used to remove nitrogen compounds and TSS from the wastewater influent. In addition, the SBR can optionally reduce wastewater toxicity and scaling potential. The SBR process utilizes a fill-and-draw reactor with mixing during the batch reaction step. A subsequent step of clarification preferably occur in the same tank. Optionally, the wastewater may be aerated during the fill step. However, if the influent does not include significant amounts of ammonia or TKN, it is preferable to have minimal or no aeration in the fill step to promote denitrification while eliminating or reducing nitrification. This process and a suitable reactor are referred to as anoxic SBR process or reactor in this specification.

In general, high nitrate concentrations are a concern because nitrate is a preferred electron acceptor for biological reduction over selenate. Nitrate is addressed in the process and apparatus by way of anoxic denitrification in the SBR.

Ammonia contained in wastewater influent is a concern because concentration in the final effluent may be regulated and because oxidation of ammonia may increase nitrate concentration. If required, this issue may be addressed by removing the ammonia biologically by using a nitrification/denitrification (or aerobic/anoxic) SBR process rather than an anoxic SBR process.

Hardness in the influent can cause scaling in a media bed. A pH or temperature shift in the reactor may cause precipitation of calcium or magnesium sulfates or carbonates. Wastewater influent can contain high levels of sulfate, calcium and magnesium resulting in a danger of scaling conditions, which are exacerbated with increasing alkalinity. The scaling potential of the wastewater may be reduced by treating the wastewater in an SBR prior to biological removal of selenium.

High TSS, particularly when it is essentially inorganic, causes problems with developing and controlling a biomass in a media bed. Optionally, TSS concentration can be reduced prior to the biological removal of selenium by way of the SBR method.

The presence of various heavy metals, for example Cu, As or Hg, or related oxidized contaminants, are a concern because they may be regulated in the effluent but are difficult to remove in low concentrations. If heavy metals need to be removed, a metal precipitant may be added to the SBR process. In another option, GAC can be added in the SBR process to remove toxic materials or improve sludge settleability or both.

The presence of selenium in wastewater, as selenate or selenite, is a concern because of recent regulation of selenium concentrations in the effluent directly or indirectly, for example through fish tissue concentrations in the receiving body. The selenium is difficult to remove because of its low concentration and its tendency to form selenate or selenite and dissolve in water making physical or chemical removal difficult, costly or inefficient. Selenium is addressed in the process and apparatus by biologically reducing it to elemental selenium and then precipitating it for removal.

FIG. 1 is a schematic diagram showing the biochemical change of nitrogen states in a nitrification and denitrification processes. It can be observed that both nitrification and denitrification are required for ammonia removal from wastewater. In SBR systems, nitrification and denitrification can occur simultaneously in the same tank. Under low dissolved oxygen conditions, denitrification can occur in the floc interior, while nitrification is occurring at the floc exterior. Low dissolved oxygen (anoxic) conditions allow for both aerobic and anaerobic zones to be present in the same tank depending on mixing conditions and distance from the aeration point.

Figure 2:
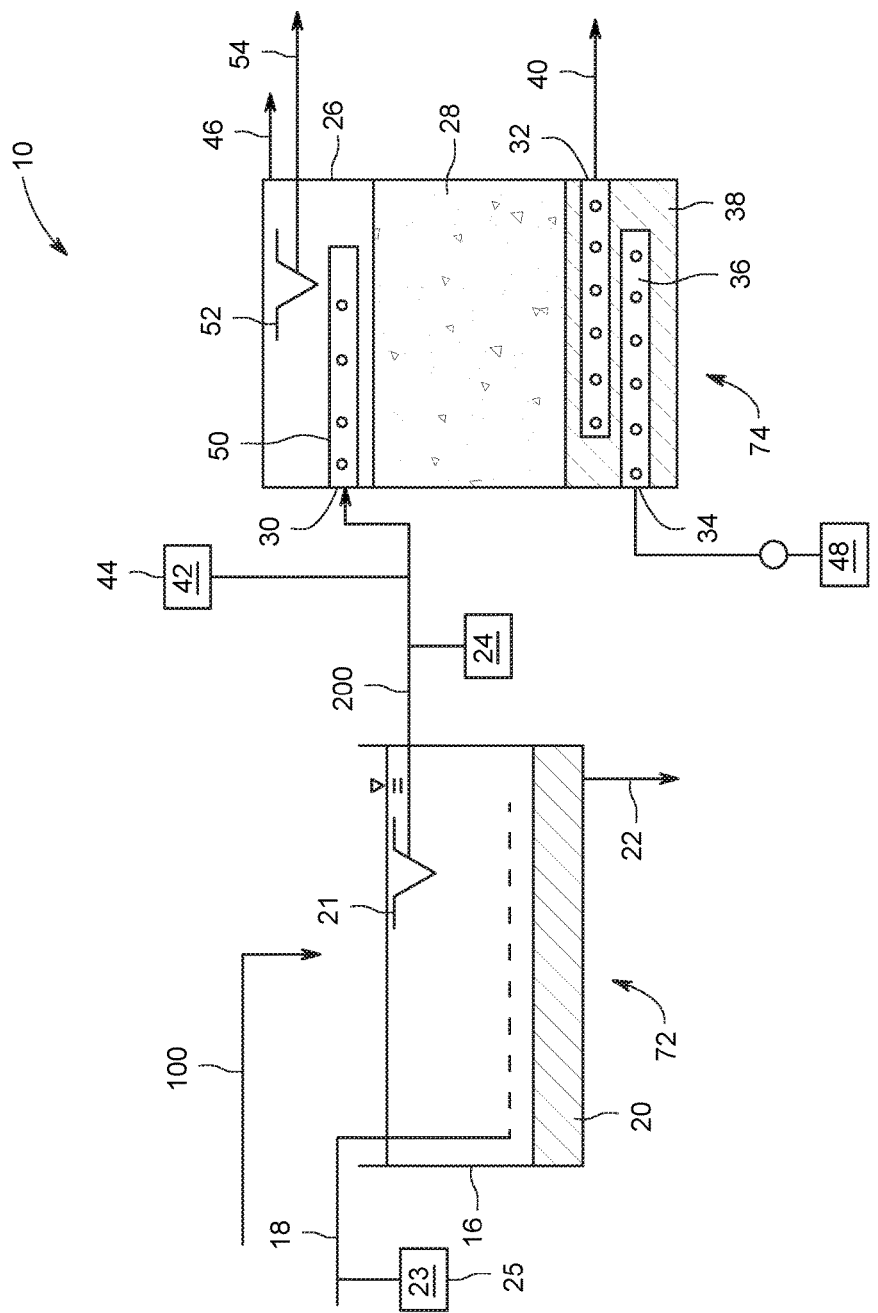
FIG. 2 is a schematic representation of a treatment system for removing selenium from water.

FIG. 2 shows a treatment system 10 having a nitrogen removal area 12 upstream of the selenium removal area 14. The treatment system 10 may be used to reduce the total selenium content of wastewater influent 100 containing nitrate or TSS or both. In the nitrogen removal area, an SBR method is used to denitrify the influent 100 and produce an intermediate stream 200 with reduced nitrate (or total nitrogen) or TSS concentrations or both. In the selenium removal area, a biological reduction process is used to remove selenium from the intermediate stream 200 and to produce treated effluent 300. Treated effluent has a reduced total selenium concentration, preferably below discharge regulation limits.

Influent 100 flows into SBR tank 16 of nitrogen removal area 12. The SBR process may be designed based on the influent nitrate or TSS load or both, and considering the influent scaling potential and biological toxicity.

In one step, the tank 16 is filled with influent 100 and mixed. Any additives may be mixed with the influent 100 in, or on its way to, the tank 16. Mixing causes the influent 100 to contact sludge left in the tank 16 after previous cycles. Optionally, the influent may be admitted to that tank 16 though a layer of sludge initially at the bottom of the tank. In another option, a partial batch of influent 100 is brought into the tank 16 and allowed to contact the residual sludge for a period of time before the rest of the batch of influent 100 is added. If an anoxic SBR process is used, the tank 16 is mixed with little or no aeration to preserve anoxic conditions in the tank 16. Mixing may be provided, for example, by a paddle or other mechanical mixer. If the influent 100 contains significant amounts of ammonia or TKN, influent 100 is aerated through aeration means 18, for example a fine bubble diffuser, to promote the growth of aerobic bacteria present in the SBR tank 16 during the fill, mixing, or both. This encourages the nitrification of ammonia into oxidized nitrite and nitrate forms. In either case (aerobic or anoxic conditions in the tank 16) some of the bacteria settle forming additional sludge 20. As sludge 20 settles in tank 16, anaerobic zones are created near the bottom of tank 16. The low dissolved oxygen conditions in the anaerobic zones promote the growth of anaerobic bacteria, which use oxidized nitrogen and convert it to molecular nitrogen gas. If both aerobic and anaerobic zones may be present in the tank 16 during this stage, the nitrification and denitrification of nitrogen compounds can occur simultaneously. Alternatively, with an anoxic SBR, there is little or no nitrification but comparatively more denitrification.

In another step, the mixing and aeration means 18, if any, is turned off. The sludge 20 is allowed to separate and settle, resulting in a clarified supernatant that can be discharged as intermediate stream 200 using a decanting mechanism 21 such as a controllable gate. Sludge 20 can then be removed to a sludge treatment area 22 for example for dewatering and disposal. In another step, the tank 16 is refilled with influent 100.

If continuous flow of intermediate stream 200 is required, two or more SBR tanks 16 may be provided so that one tank receives the wastewater influent 100 while the other completes its treatment cycle.

Optionally, the nitrogen removal area 12 can be operated at high pH (for example 7.0-8.5) to promote scale formation in the SBR tank 16. For example, a base may be added to the influent 100 directly or in the tank 16. Scale is removed with sludge 20. Optionally, the pH level of the intermediate stream 200 can be lowered, for example to 6.0 to 7.0, to decrease the possibility of scale formation in the reaction vessel 26.

If the wastewater influent 100 contains heavy metals, a precipitant 23 may be added to the influent 100 during operation of system 10. In the system 10 shown, precipitant 23 is added to the wastewater influent 100 or directly into tank 16 from a precipitant source 25. The precipitant 23 may be an organic polymer such as MetClear™ metals remover product manufactured by GE Water and Process Technologies.

If the wastewater influent 100 contains toxic materials, an adsorbent media such as GAC may be provided in the tank 16 to remove toxic materials and optionally promote sludge settling.

Following its discharge from tank 16, intermediate stream 200 flows to the selenium removal area 14 either by gravity or by pump 24. A break tank can be added between the nitrogen removal area 12 and selenium removal area 14. Selenium removal area 14 includes a reaction vessel 26 that supports a population of selenium reducing organisms, primarily facultative anaerobic bacteria. The organisms may be located in a fixed biofilm on a media bed 28. Reaction vessel 26 as shown is organized as a fixed media, single stage, downwards plug flow reactor. Optionally, the reaction vessel 26 may be configured for upwards flow and multiple reactors may also be used. Other types of reactors, including other types of fixed film reactors, may be used. For example, reaction vessel 26 may be a moving bed reactor or a fluidized bed reactor. A suitable commercially available system for the selenium removal area 14 is an ABMet™ reactor manufactured by GE Water and Process Technologies.

In the reaction vessel 26 shown, media bed 28 provides a location on which a population of microorganisms will grow and be retained within the reaction vessel. Activated carbon may be employed as the medium and provides a large surface area available for microbial growth. The activated carbon may be in the form of GAC or pelletized activated carbon. Other media might be used, for example polymeric fibers, crushed stone, pumice, sand, plastic media or gravel.

The reaction vessel 26 has an upper port 30, a lower port 32 and a backwash port 34, each of which may be connected to a distribution system 36, for example one or more perforated horizontal pipes. Aggregate 38 may be installed around the distribution systems 36 below the bed 28 to aid in flow distribution while also preventing break through of media to the distribution systems 36.

During normal operation, intermediate stream 200 enters reaction vessel 26 through upper port 30 and flows downwards through media bed 28. Treated effluent 40 exits the reaction vessel through lower port 32. If an upwards flow is used, the upflow velocity under normal forward flow conditions may be maintained at about 5 ft/hr, which is well below the settling rate of the media, which for activated carbon is about 160 ft/hr. While passing through the media bed 28, selenium is removed from the wastewater by biological reduction of the oxidized selenium species to elemental selenium.

Selenium reducing organisms occur in nature and may populate the reaction vessel 26 through their own actions over time as the treatment system 10 is operated. However, the reaction vessel 26 can be populated faster by seeding the reaction vessel 26 with a culture of appropriate organisms that have been isolated and grown separately. Microbes that have demonstrated the ability to reduce oxidized selenium to elemental form include microbes of the genus *Pseudomonas, Shewanella, Alcaligenes*. At plant start-up, a seed culture of microbes may be supplied to seed the media bed 28. Following seeding with the desired microbial culture, the reaction vessel 26 may be operated in a recycle mode for several days to allow the microbes to attach while adding nutrients to the reaction vessel 26. After seeding, normal feed flow can be introduced.

Unless the wastewater influent 100 contains other suitable matter, nutrients 42 should be added to the reaction vessel 26 during operation of the treatment system 10. In the present embodiment, nutrients 42 are added to the intermediate stream 200 from a nutrient tank 44 upstream of the reaction vessel 26. The nutrients 42 provide a carbon and energy source to support the growth and metabolism of the microorganisms in the reaction vessel 26.

Microorganisms in the reaction vessel 26 reduce selenium in the intermediate stream 200 from an oxidized state to elemental form. The elemental selenium precipitates from the wastewater in the form of stable granular nanospheres in and around the microorganisms. Since the microorganisms are attached to the media, the selenium is likewise retained within the media bed 28 until removed by a flushing procedure that will be described further below.

Some gasses may be produced in the reaction vessel 26 during operation. These gasses collect in a headspace of the reaction vessel. A gas outlet 46 may be used to release these gases to the atmosphere or collect them for further treatment.

As elemental selenium, and possibly other solids, accumulate in the media bed 26, the pressure drop across the media bed 26 will increase. At a selected time interval or pressure drop set point, backwash water 48 is pumped into backwash port 34 to flush or backwash the media bed 26. The upflow velocity during backwashing may be about 80 ft/hour, or in a range that would be used in activated carbon fluidized bed systems, but below the settling rate of the media particles.

The upflow velocity applied during flushing may result in an upward expansion of the media bed 26 by up to 30%. An upper distribution system 50, if located in the bed expansion area, may have small holes or be covered with a screen to keep media from entering it, and ports 30, 32 may be closed during flushing. During the backwash, excessive biomass growth attached to the media and solids that have been removed from the water, including selenium nanospheres, are entrained in the backwash water 48. The backwash water 48 and entrained solids are removed through troughs 52 located above the expected media expansion area and connected to a backwash effluent line 54.

Flushing may be required from between once every two weeks to only a few times each year, for example once a month. Flushing may take, for example, 30 minutes. Spent backwash water 48 may be sent to a liquid/solid separation device such as a clarifier. Cleaned backwash water 48 may be sent to the head of the system 10 or to another water treatment plant. Sludge from the clarifier may be de-watered and sent to a toxic sludge disposal system or processed further to extract the elemental selenium for safe disposal or use in industry. Although some sludge is produced, the amount is greatly reduced relative to, for example, an iron precipitation method of selenium treatment.

The system 10 and process described above are intended to provide an example or a selenium treatment process and apparatus and not to limit or define any claimed invention. Other treatment systems or process may be used within the scope of an invention defined in the following claims.

While the above description provides examples of one or more processes or apparatuses, it will be appreciated that other processes or apparatuses may be within the scope of the accompanying claims.

We claim:

1. An apparatus for treating water containing selenium comprising:
   a) an upstream sequencing batch reactor; and b) a downstream fixed film reactor reaction vessel coupled with the sequencing batch reactor and configured to remove selenium from water.

2. The apparatus of claim 1 wherein the sequencing batch reactor comprise means to add one or more of; a base, an adsorbent, a polymer, or a precipitant.

3. The apparatus of claim 1 wherein the sequencing batch reactor comprises a mechanical, non-aerating, mixer.

4. A process for treating water containing selenium comprising the steps of:
   a) mixing a batch of influent water with sludge containing living microorganisms;
   b) separating the mixture to produce an intermediary stream containing reduced concentrations of one or more of total nitrogen, sparingly soluable salts, and total suspended solids; and,
   c) reducing the selenium species in the intermediary stream.

5. The process of claim 4 wherein the pH value of the influent in contact with the sludge is maintained at a pH above 7.0 and the intermediary stream is maintained at a pH below 7.0.

6. The process of claim 4 further comprising adding one or more of a metal precipitant, a polymer, or adsorbent to the water influent.

7. The process of claim 4 wherein the mixture is maintained under anoxic conditions.

\* \* \* \* \*